July 14, 1931. J. D. DURANT 1,815,000
PRESSURE GAUGE
Filed March 18, 1929
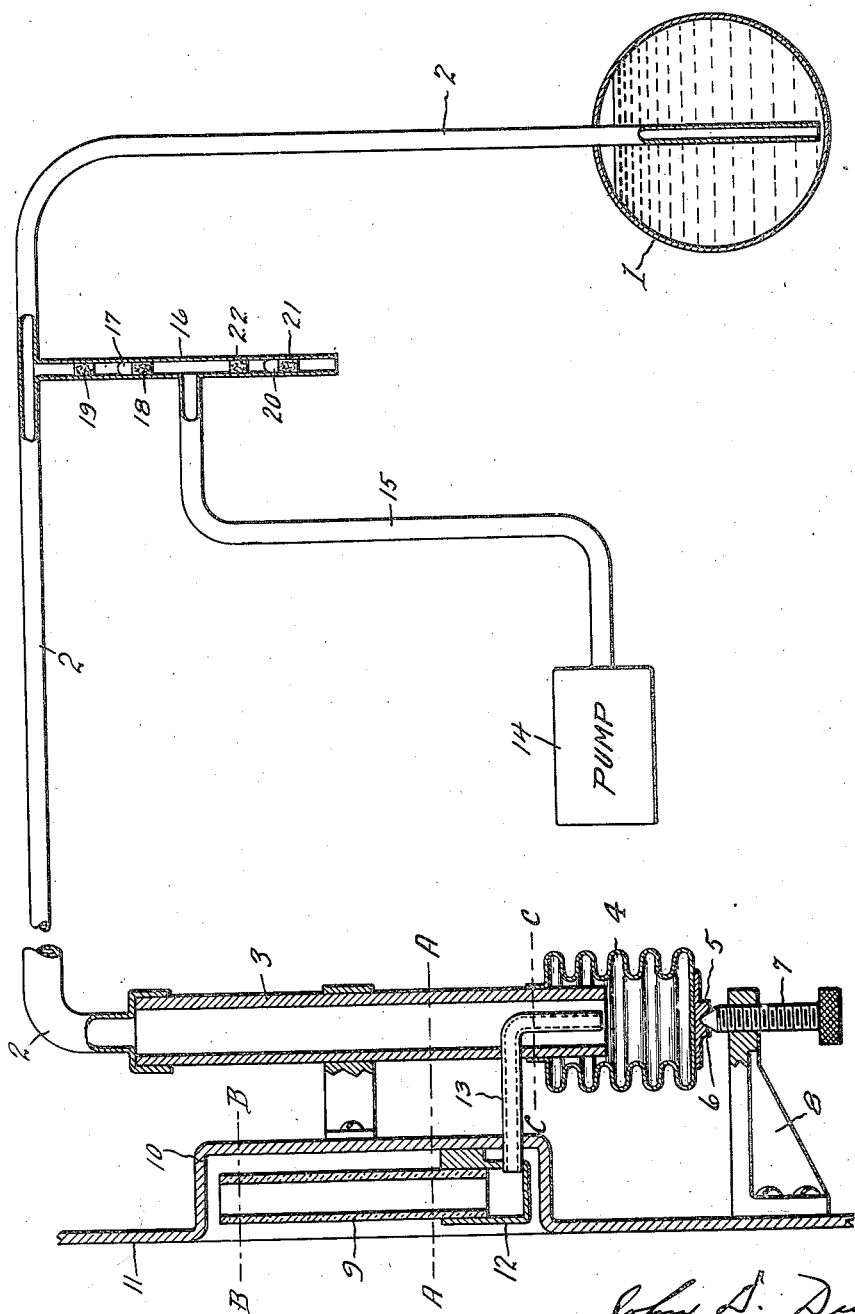
INVENTOR
John D. Durant,
BY Hull, Brock & West,
ATTORNEYS Patented July 14, 1931

1,815,000

UNITED STATES PATENT OFFICE

JOHN D. DURANT, OF CLEVELAND, OHIO, ASSIGNOR TO THE GABRIEL COMPANY, OF CLEVELAND, OHIO, A CORPORATION OF OHIO

PRESSURE GAUGE

Application filed March 18, 1929. Serial No. 347,842.

This invention relates to gauges for indicating the depth of liquid in tanks, and more particularly to gauges of the type that are employed for indicating the depth of liquid in tanks or other receptacles employed in connection with automobiles.

In gauges employing a liquid column for indicating the height or level of liquids in tanks, it is desirable to provide simple and adjustable means whereby the zero level may be quickly and accurately determined.

It is the general purpose and object of this invention to provide a gauge of this character with such means; and in the drawing forming part hereof there is shown a detail in section of a gauge construction whereby the adjustment referred to may be conveniently obtained, the system in which the gauge is used being shown on a smaller scale at the right hand side of the view.

Describing by reference characters the various parts shown in the drawing, 1 denotes a tank containing the liquid, the height or depth of which is to be indicated by the gauge, the tank shown herein being such as is used for gasoline. Extending from the tank is a hydrostatic conduit 2 which is connected at its upper end with a tube 3, to the lower portion of which is secured, as by brazing, the upper end of a contractible and expansible receptacle 4, the same being of bellows formation. The said receptacle 4 may be made of any suitable flexible metal or material and has secured to the bottom thereof a central reinforcing plate 5 having a notch 6 for the reception of the pointed upper end of a screw 7, threaded into a bracket 8 which may be secured to the front of the instrument board of an automobile.

9 denotes the gauge glass proper, which is shown as mounted in a recess 10 in the instrument board 11. The bottom of the gauge glass is shown as fitting tightly into the top of a cup-like receptacle 12, the bottom of which is connected with the lower portion of the tube 3 by means of a short tube 13 of restricted bore extending horizontally from the cup 12 and having its outer end extending downwardly within and approximately to the bottom of the tube 3.

For the purpose of purging the conduit 2 of liquid and maintaining the said conduit full of air, a pump 14 is employed, the said pump communicating by a conduit 15 with a short conduit 16 which is connected to the conduit 2. The conduit 16 is provided with a mercury valve 17 therein above its point of communication with conduit 15, the mercury valve being seated on a porous partition 18, there being a porous dam 19 above the mercury valve to prevent the latter from being driven into the conduit 2. The portion of the conduit 16 which extends below the conduit 15 is provided with a similar mercury valve 20 resting on a porous partition 21, there being a porous dam 22 above the said valve.

In operation, the parts 3, 4, 9, 12 and 13 constitute a U-tube which, when the tank 1 is empty will assume the zero level indicated by the dotted line A—A. When the tank 1 is full, the hydrostatic pressure in the line 2 will depress the column of liquid in the pipe 1 and the liquid will be raised in the gauge tube 9 to a point indicated by the line B—B, at which time the liquid in the tube 3 will fall to a level indicated by the line C—C.

Should any liquid enter the conduit 2, it will be displaced from time to time by operating the pump 14, which will result in drawing in air through the valve 20 and forcing it past the valve 17 into the conduit 2, thereby blowing out all liquid from said conduit.

The endwise contractible and expansible receptacle 4 constitutes a simple, effective and convenient means, forming part of the conduit connecting the tubes 3 and 9, for bringing the level of the liquid in the branches 3 and 9 coincident with the zero mark on the scale of the latter tube. Assuming that the liquid in the tank 1 has fallen to the datum level, then should the level of the liquid in the gauge glass be above the line A—A, this can be readily cured by turning the screw 7 in the appropriate direction to increase the capacity of the receptacle 4, until the liquid stands at the desired level in both branches 3 and 9. Should the liquid level stand below the zero mark or indication, then this inaccuracy can be readily corrected by operating the screw 7 in a direction requisite to decrease the capacity of the receptacle 4.

It will be noted that the lower end of the tube 13 extends considerably below the line C—C, which indicates the lowest level of liquid normally within the tube 3. This insures that the lower end of the tube 13 will be sealed by liquid under all conditions, even when the pump 14 is operated to purge the conduit 2. Furthermore, the tube 13, being of small cross sectional area, prevents sudden fluctuations in pressure from affecting the column of liquid in the tube 9.

From the foregoing description it will be evident that I have produced a gauge which enables me to secure the results referred to in a very simple and effective manner and which is, moreover, simple of construction and economical of production.

Having thus described my invention, what I claim is:

1. A liquid containing gauge comprising a vertically extending tube open at both its ends, an elongated bellows-like receptacle secured at its upper end to the lower portion of said tube and extending therebelow, a gauge glass tube at one side of the first mentioned tube, a conduit of restricted bore in sealed communication at one end with the bottom of said gauge tube and sealed through one side of the first mentioned tube at a point above the end thereof and having a portion extending downwardly inside said tube, means engaging the lower end of said bellows-like receptacle for moving such end toward and from the first tube thereby to vary the effective length and capacity of said receptacle, and means supporting the various parts in proper relation to each other.

2. A liquid containing gauge comprising a vertically extending tube open at both its ends, an elongated bellows-like receptacle secured at its upper end to the lower portion of said tube and extending therebelow, a gauge glass tube at one side of the first mentioned tube, a conduit of restricted bore in sealed communication at one end with the bottom of said gauge tube and sealed through one side of the first mentioned tube at a point above the end thereof and having a portion extending downwardly inside said tube, means engaging the lower end of said bellows-like receptacle for moving such end toward and from the first tube thereby to vary the effective length and capacity of said receptacle, and means supporting the various parts in proper relation to each other, said downturned portion of said restricted bore conduit extending substantially to the bottom of said vertically extending tube.

In testimony whereof, I hereunto affix my signature.

JOHN D. DURANT.